(12) United States Patent
Brandt et al.

(10) Patent No.: US 8,794,776 B2
(45) Date of Patent: Aug. 5, 2014

(54) INSTRUMENT FOR A MOTOR VEHICLE

(75) Inventors: Peter Brandt, Aschaffenburg (DE); Heiko Charle, Ruesselsheim (DE); Dino Demma, Ruesselsheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 174 days.

(21) Appl. No.: 13/439,962

(22) Filed: Apr. 5, 2012

(65) Prior Publication Data

US 2012/0257373 A1    Oct. 11, 2012

(30) Foreign Application Priority Data

Apr. 8, 2011    (DE) .......................... 10 2011 016 425

(51) Int. Cl.
 *G01K 1/04* (2006.01)
(52) U.S. Cl.
 USPC .................. 362/23.01; 362/23.09; 362/23.11; 362/558
(58) Field of Classification Search
 USPC ............ 362/23.01, 23.09, 23.11, 27, 28, 558; 40/546
 See application file for complete search history.

(56) References Cited

U.S. PATENT DOCUMENTS

| | | | |
|---|---|---|---|
| 5,555,161 A * | 9/1996 | Roe et al. ....................... | 362/555 |
| 5,601,928 A * | 2/1997 | Katayama et al. ............ | 428/500 |
| 6,267,072 B1 * | 7/2001 | Seto et al. ...................... | 116/287 |
| 6,548,150 B1 * | 4/2003 | Ishikawa et al. ............ | 428/195.1 |
| 6,573,877 B2 * | 6/2003 | Wedel et al. ....................... | 345/4 |
| 6,599,613 B1 * | 7/2003 | Kasahara et al. ............. | 428/140 |
| 6,938,551 B2 * | 9/2005 | Inoue et al. .................... | 101/491 |
| 7,088,045 B1 * | 8/2006 | Zich .................................. | 315/84 |
| 7,742,125 B2 * | 6/2010 | Thomas et al. ................. | 349/86 |
| 7,752,992 B2 * | 7/2010 | Takeshige et al. ........... | 116/62.4 |
| 8,607,726 B2 * | 12/2013 | Oguro et al. ................... | 116/334 |
| 2010/0150513 A1 | 6/2010 | Zhang et al. | |

FOREIGN PATENT DOCUMENTS

| | | |
|---|---|---|
| DE | 10102774 A1 | 8/2002 |
| DE | 10153100 A1 | 5/2003 |
| DE | 102007033568 A1 | 1/2009 |
| EP | 2450726 A1 | 5/2012 |
| FR | 2760413 A1 | 9/1998 |
| WO | 0136870 A1 | 5/2001 |

OTHER PUBLICATIONS

German Patent Office, German Search Report dated Jan. 2, 2012 for German Application No. 102011016425.1.

* cited by examiner

*Primary Examiner* — Ali Alavi
(74) *Attorney, Agent, or Firm* — Ingrassia Fisher & Lorenz, P.C.

(57) ABSTRACT

An instrument is provided for a motor vehicle that includes, but is limited to a display area and a housing, which surrounds the display area. A transparent instrument covering is held spaced from the display area by the housing. The instrument covering is a transparent light conductor panel, in which a symbol display area is arranged. The light conductor panel includes, but is not limited to light-diffusing Nano particles in its volume in the symbol display area.

19 Claims, 7 Drawing Sheets

FIG 1

INSTRUMENT FOR A MOTOR VEHICLE

CROSS-REFERENCE TO RELATED APPLICATION

This application claims priority to German Patent Application No. 10 2011 016 425.1 filed Apr. 8, 2011, which is incorporated herein by reference in its entirety.

TECHNICAL FIELD

The present invention relates to an instrument for a motor vehicle, which comprises a display area and a housing, which surrounds the display area. A transparent instrument covering is held spaced from the display area by the housing.

BACKGROUND

The publication DE 101 02 774 A1 a display device, in particular for a vehicle, is known in this respect. This display device comprises a partially light-permeable display area and an illumination device for backlighting the display area. The backlighting comprises a light conductor, which extends on the back of the display area. The laterally light can be coupled into the light conductor. The light conductor conducts light to the display area via total reflection. A reflective coating is applied to the smooth surface side of the light conductor facing away from the display area in individual locations.

In order to illuminate a display symbol with the help of a light conductor body, a reflective coating is applied to a smooth surface of the light conductor body in the form of the display symbol in places with display symbol, so that the light radiation conducted through the light conductor body by means of total reflection illuminates the display symbol in a back-lit manner on the reflective coating.

At least one object is to provide an instrument for a motor vehicle with a light conductor panel that is not only used as back illumination but can also serve for a spatial display of symbols. In addition, other objects, desirable features and characteristics will become apparent from the subsequent summary and detailed description, and the appended claims, taken in conjunction with the accompanying drawings and this background.

SUMMARY

In an embodiment, an instrument for a motor vehicle is described. The instrument comprises a display area and a housing, which surrounds the display area. A transparent instrument covering is held spaced from the display area by the housing. The instrument covering is a transparent light conductor panel in which a symbol display area is arranged. The light conductor panel comprises light-diffusing Nano-particles in its volume in the symbol display area.

Such an instrument covering brings with it the advantage that with normal driving operation parameters, normal operating equipment states and with unproblematic road traffic conditions the view of the display area of the instrument is possible in an unobstructed manner through the instrument covering consisting of a transparent light conductor panel despite the light-diffusing Nano particles that are present in the instrument covering in the symbol display areas, since these light-diffusing Nano particles remain invisible when looking through normally.

Only when light from marginal sides of the light conductor falls onto the Nano particles will these be illuminated in a light-diffusing manner. Display symbols pointing out critical road traffic situations or critical operating equipment states or critical driving operation parameters in the symbol display area, which because of a marginal illumination device of the instrument covering, are illuminated brightly and can warn the driver.

Since on a vehicle or on an instrument panel, a plurality of instruments present a situation in which it is possible to provide different symbol displays. Thus, for example the instrument covering of a tachometer can cause a warning symbol to be illuminated when a critical engine rotational speed is exceeded. In an instrument covering of a speed measuring instrument a periodic flashing of the permissible speed limit can, for example, be provided in the symbol display area of the instrument covering of the speed measuring instrument for driving through towns when the usual town drive-through limit is exceeded.

It is also possible in a further embodiment that the symbol display area comprises warning signs in the form of traffic sign symbols. Thus, for example when turning into a one-way street in the wrong direction, the warning sign of the driving direction prohibition can light up in the symbol display area. In the case of large-area instrument coverings, different symbols can also be illuminated next to or on top of one another in adjacent symbol display areas through marginal introduction of light, so that practically on an instrument panel with a plurality of instruments for example the most important traffic sign symbols such as "stop", "yield", "no waiting", "no stopping" and similar support the driver in interaction with a suitably equipped navigation system in order to securely and reliably operate his vehicle even in unfamiliar city traffic.

In a further embodiment it is provided that the symbol display area comprises outer contours and the light conductor panel recess contours. In order to provide a closed instrument covering, the outer contours of the symbol display area are connected to the recess contours of the light conductor panel in a materially joined manner. With this fitting of outer contours of the symbol display area into recess contours of the light conductor panel it is possible to integrate any symbols in symbol display areas of the instrument covering.

In order to make such symbols visible, the light conductor panel comprises a margin that is coupled to an illumination device. Only when the illumination device is switched on and light is fed into the margin of the light conductor panel can the prepared symbols now light up also in color in the symbol display areas because of the now active light-diffusing Nano particles and depending on the color of the light source of the illumination device. Here, it can be possible that the light from switchable colored light sources can be coupled into the margin of the instrument covering and causes the Nano particles to light up in a light-diffusing manner in color in the symbol display area, so that via the coloring such as green, yellow or red, different danger states can also be signaled.

To this end, the illumination device comprises at least one light source. The light of the light source can be coupled into the margin of the instrument covering and causes the Nano particles in the (Polymethylmethacryl) plastic, which for the symbol display area, is provided with suitable light-diffusing Nano particles.

Since the attachment of light sources directly in the region of the margin of the light conductor panel is frequently difficult for space reasons, it is provided to arrange at least one light conductor between the light source and the margin. The light source in this case can comprise a light-emitting diode, which on a first end of a light conductor couples in light. The free light conductor end can be materially connected to the margin of the light conductor panel. With the material connection it is advantageous to provide a transparent adhesive matched to the refractive index of light conductor and light conductor panel in order to keep reflection losses between the light conductor panel and the light conductor end as small as possible.

In order to achieve coupling of the light into the instrument covering that is as free of loss or free of reflection as possible, the margin of the instrument cover can be bent down at least partially to an end of the light conductor and coupled to the light conductor end. The bent marginal region of the light conductor panel can additionally have a mirror coating in order to minimize light or illumination losses here as well.

In another embodiment it is provided that the margin of the instrument covering comprises an angular chamfer having a mirror coating. On this chamfered margin the light conductor, with respect to the light conductor panel, can be orthogonally guided up to the instrument covering so that the light exiting from the light conductor end enters the chamfered margin of the light conductor panel where it is reflected in the direction of the volume of the light conductor panel.

A further possibility of causing the Nano particles in the symbol display area of the light conductor panel to be illuminated in a light-diffusing manner is to provide an illumination ring of a material of the light conductor panel, which surrounds the margin of the instrument covering and comprises a higher concentration of light-diffusing Nano particles than the symbol display area.

In order to amplify the effect of such an illumination ring, the illumination ring can have a mirror coating on its surfaces. This inner annular surface with which the illumination ring contacts the margin of the light conductor panel remains free of any mirror finish. In addition, the inner edge of the illumination ring can be connected to the margin of the light conductor panel in a materially joined manner, so that in turn free of reflection the light diffused in the illumination ring conducts light diffused with high intensity on the light-diffusing Nano particles arranged in high concentration there through the light conductor panel to the symbol display area. The end of the light source can be coupled to such an illumination ring tangentially and thus advantageously in a space-saving manner. The tangential coupling makes possible a non-critical curvature radius for the light conductor, so that the light conductor can follow the outer radius of the instrument housing.

An instrument panel can be equipped with a plurality of such individual instruments and comprise corresponding instrument coverings. In addition, a motor vehicle in turn can comprise such an instrument panel and thus utilize the advantages of such instruments subject to the increase of the road traffic safety.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
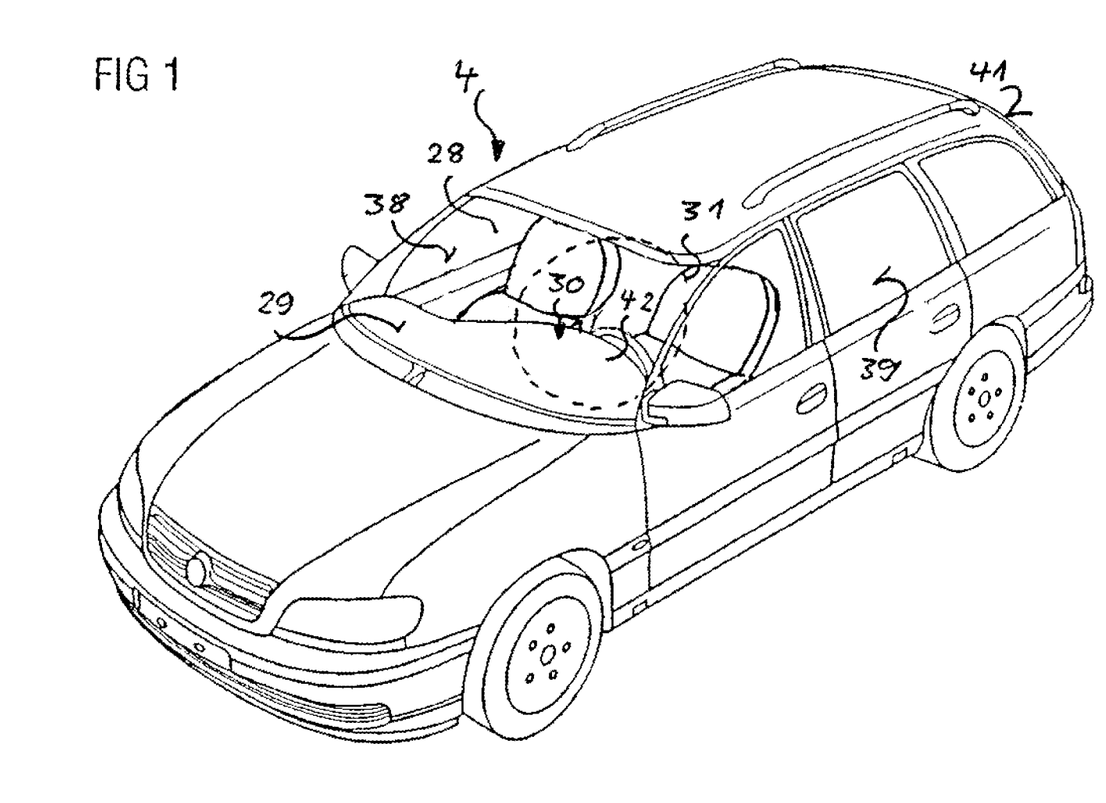
FIG. 1 shows a perspective view of a motor vehicle with an instrument panel.

FIG. 1 shows a view of a motor vehicle 4, which comprises an inner region 28. The inner region 28 comprises an instrument panel 30 in its front region 29. On the instrument panel 30, instruments are arranged in an immediate view region 31 of the vehicle driver in such a manner that mirror reflections of windshield 38, side windows 39 and back window 41 on the instrument cover glasses of the instruments of the instrument panel 30 do not interfere with the visual range 31 of the vehicle driver, but are rather deflected towards the floor region of the motor vehicle 4 through suitable inclination of the instrument cover glasses. An additional anti-glare screen 42 of the instrument panel 30 can also lessen the glare effects of external light sources through the windshield 38, since the instrument cover glasses are arranged in the shadow of the anti-glare screen 42.

A further measure of clearly detecting warning symbols of the instruments includes providing symbol display areas integrated in instrument coverings, which light up brighter than the surroundings in the inner region 28 and brighter than the mirror reflections, which can occur through the windshield 38, the side windows 39 and the back window 41. A suitable symbol display area of the instrument covering of the instruments should cause the warning symbols to be illuminated less intensively in darkness than in brightness in order to avoid a dazzling effect on the driver.

Figure 2:
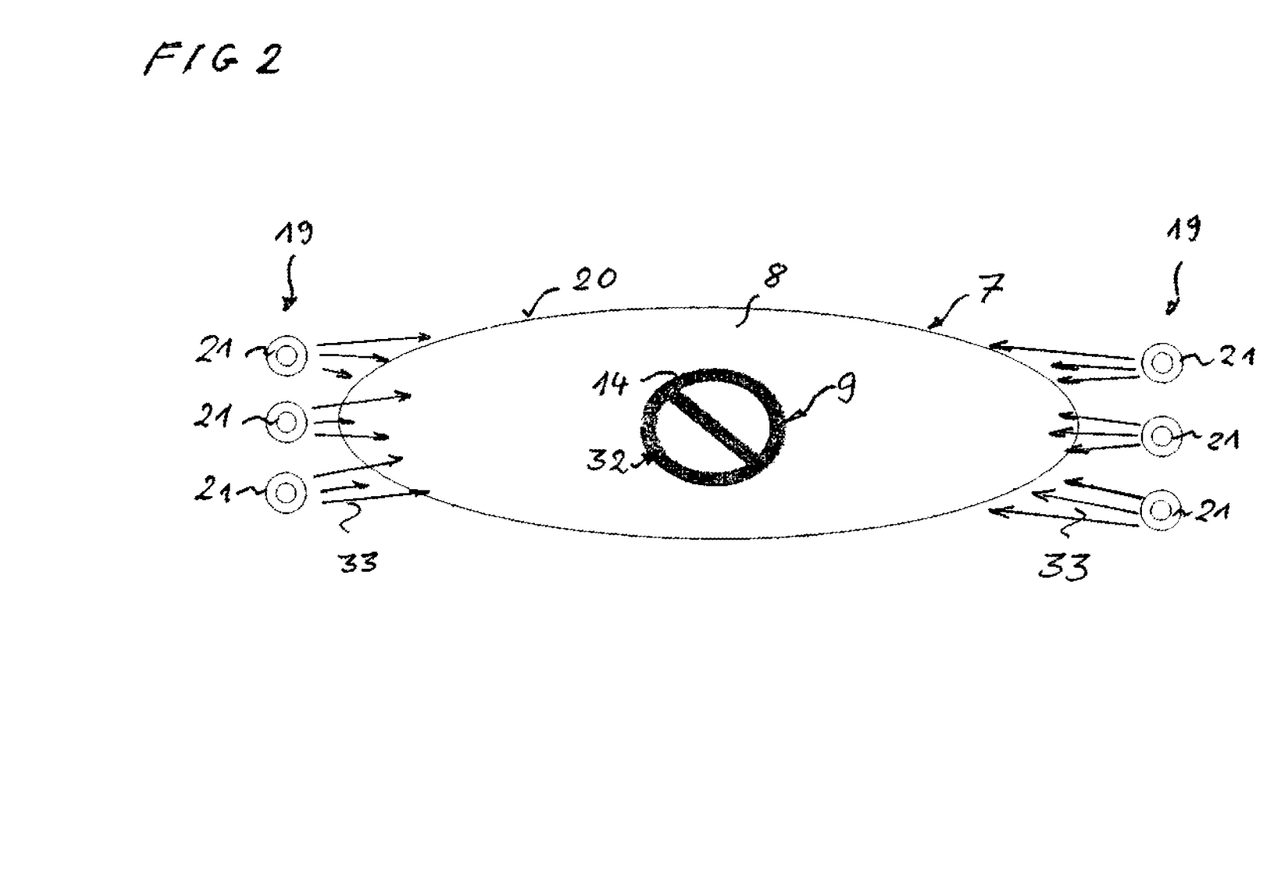
FIG. 2 shows a schematic diagram of the instrument covering with integrated warning symbol in a symbol display area.

FIG. 2 shows a schematic diagram of the instrument covering 7 with integrated warning symbol 32, which lights up only when a margin 20 of the instrument covering 7 is illuminated out of a light conductor panel 8 with the help of an illumination device 19, for example, through light sources 21. Light 33, which is marginally coupled into the light conductor panel 8, is directed from there to a symbol display area 9. In the volume of the light conductor panel 8, light-diffusing Nano particles in form of the warning symbol 32 are arranged. The Nano particles cause the warning symbol 32, which in this case has the form of a traffic symbol 14, to light up in a light-diffusing manner. If no light 33 is directed into the margin 20 of the light conductor panel 8 of the instrument covering 7, the light-diffusing Nano particles are invisible and the entire light conductor panel is and remains transparent, so that a display area, which is protected through such an instrument covering 7, is unrestrictedly visible to the driver.

Such a warning symbol 32 can alert the driver to critical traffic situations such as collision hazards and/or to critical operating equipment states such as a lack of oil since it can be designed relatively large. As shown here, road traffic symbols such as prohibition and information signs can also support the driver in order to be able to react more quickly to traffic prohibitions or traffic information, for example, in a city environment unfamiliar to him. To this end it is provided that the symbol display area 9 interacts, for example, with a suitably intelligent navigation system, which also detects detailed conditions for city driving operation, preventing the driver to take wrong decisions through suitable warning symbols 32.

Figure 3:
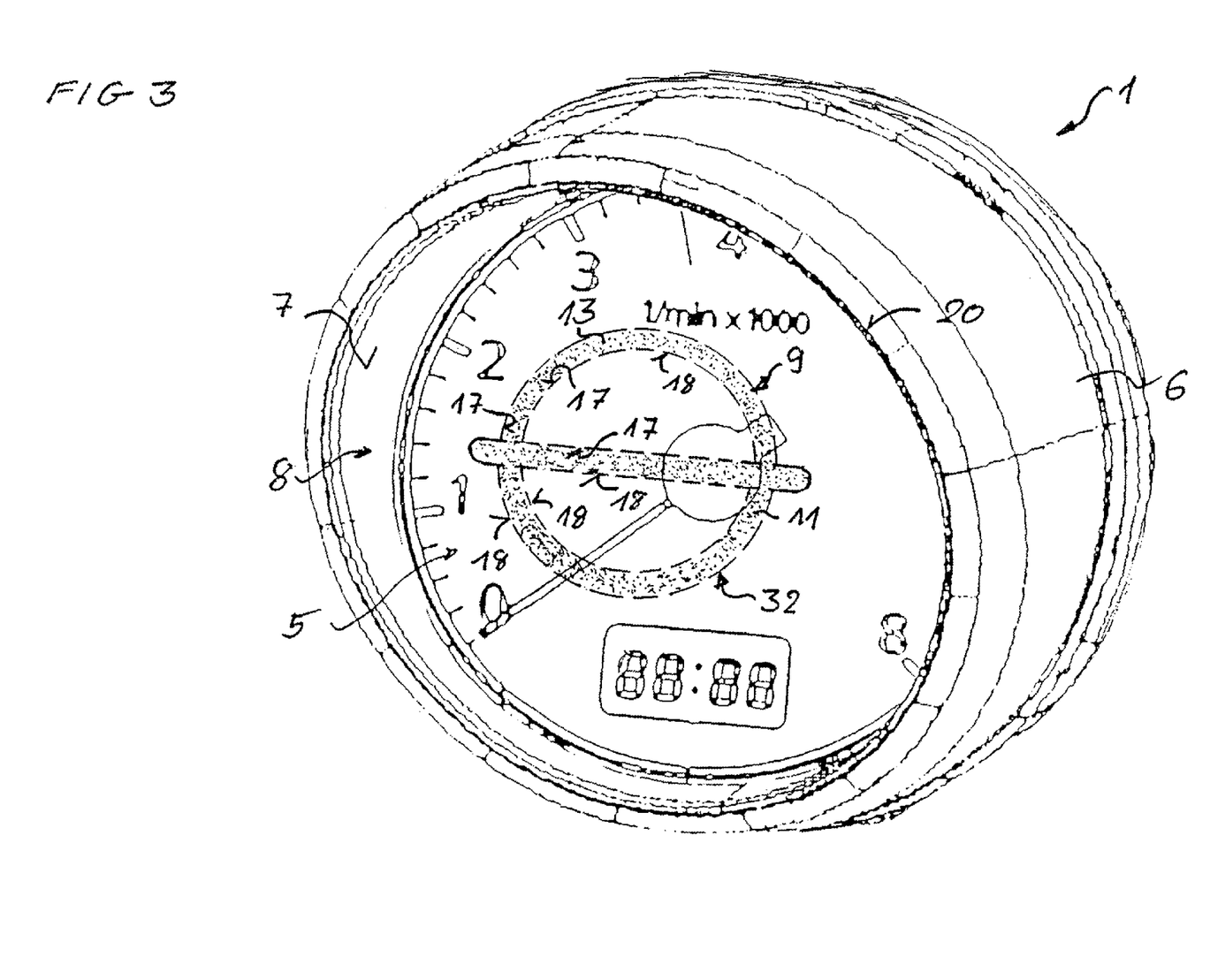
FIG. 3 shows a schematic perspective view of an instrument according to a first embodiment.

FIG. 3 schematically shows a perspective view of an instrument 1 according to a first embodiment. The instrument 1 shown in FIG. 3 comprises a display area 5, which is surrounded by a housing 6. The housing 6 holds the instrument covering 7 at a predetermined spacing to the display area 5 and, as already mentioned above, this instrument covering 7 has an inclination angle relative to the display area 5, so that mirror reflections of windshield, side windows and back window do not interfere with the visual range of the driver.

The instrument covering 7 comprises a light conductor panel 8, which conducts light marginally coupled-in via the margin 20 through the volume of the light conductor panel 8 as far as into the symbol display area 9. This symbol display area 9 comprises light-diffusing Nano particles 11, which in the embodiment shown in FIG. 3, are shaped for example into a no entry traffic sign symbol 13 and diffuse the marginally coupled-in light in such a manner that the warning symbol 32 lights up, for example, when the driver or the vehicle turns into a one-way street in the wrong driving direction.

In order to integrate such a symbol with an outer contour 17 of a material, which comprises for example PMMA (polymethyl methacrylate) with embedded light-diffusing Nano particles 11 in the light-conductor panel 8, a recess contour 18 can be provided on the light conductor panel 8, into which the warning symbol 32 is materially joined with its outer contour 17. For such an insertion, an adhesive can be used which corresponds to the refractive index of the conductor panel 8 in order to keep the reflection losses at the transition to the symbol display area 9 low.

In the embodiment shown here, a traffic sign symbol 13 is integrated in the light conductor panel 8 which is to light up when the driver turns into a one-way street in the wrong driving direction. In order to timely detect such a driving error and cause the warning symbol 32 to light up, an illumination device for the symbol display area 9 is connected to a suitably equipped navigation system. Thus, driving errors of a driver in unfamiliar city traffic are avoided. Since the warning signal 32 is arranged in a tachometer instrument, it can also light up in a warning manner when a critical engine rotational speed is exceeded. However, in a symbol display area 9 with an associated illumination, only one warning symbol 32 can light up in each case.

Figure 4:
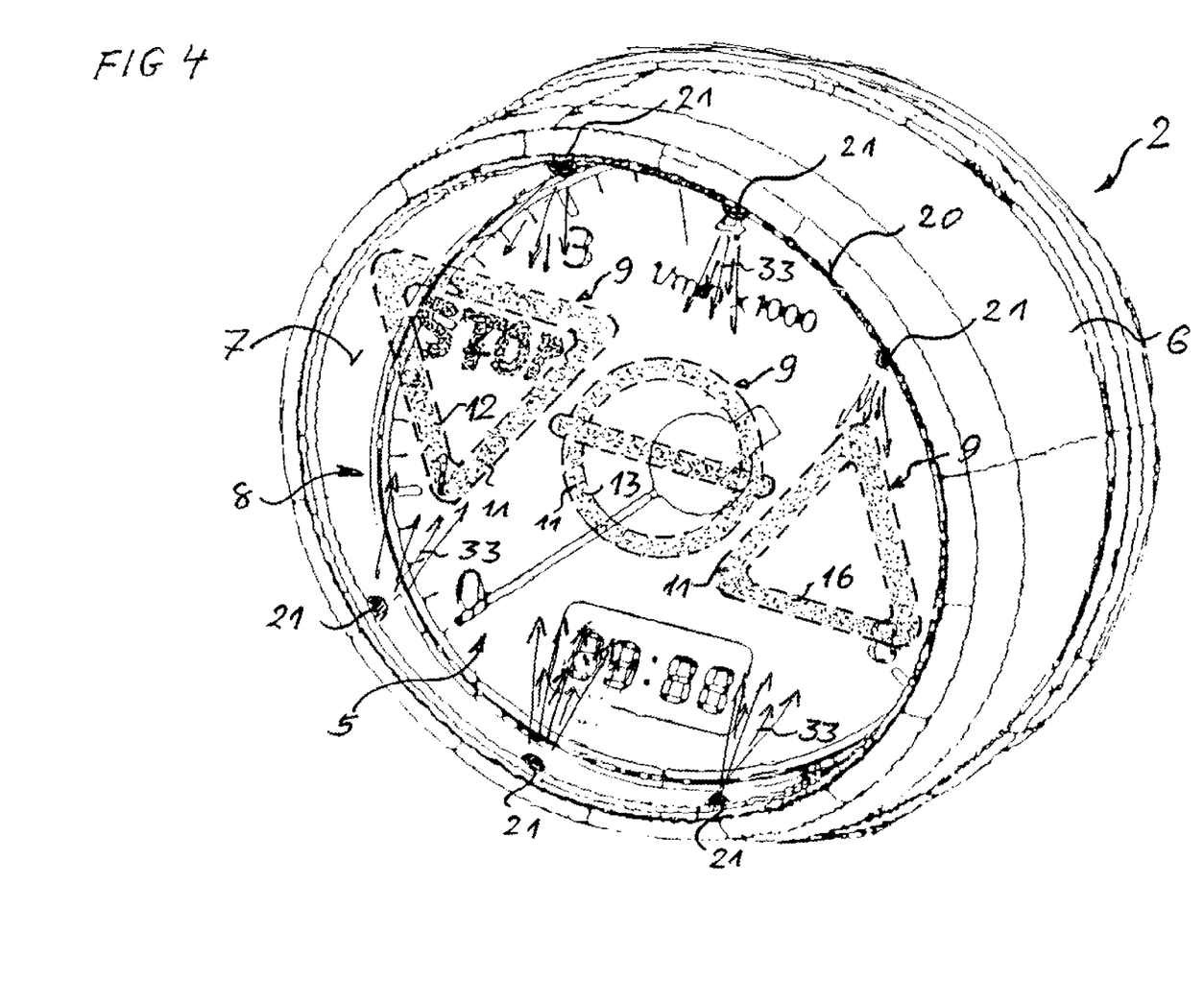
FIG. 4 shows a schematic perspective view of an instrument according to a second embodiment.

FIG. 4 shows an instrument 2 of a second embodiment. Components with same functions as in the preceding figures are marked with the same reference characters and are not separately explained. This second embodiment shows an instrument 2 comprising three symbol display areas 9 in a single instrument covering 7. In this regard, only symbolic light sources 21 are indicated on the margin 20 of the light conductor panel 8 in this case, which are located opposite each other in pairs and can individually radiate light onto the three symbol display areas 9 and cause the warning symbols of Nano particles 11 provided in the symbol display areas 9 to light up in a light-diffusing manner.

With this instrument covering 7 it is possible, for example, with the left two light sources 21 to cause a traffic sign symbol 12 in the shape of a stop sign to light up as required. With the middle two light sources 21, the no entry traffic sign symbol 13 already known from FIG. 3 can light up. With the light 33 of the symbol display area 9 on the right side, the traffic sign symbol 16 with the information "yield" can be displayed.

Figure 5:
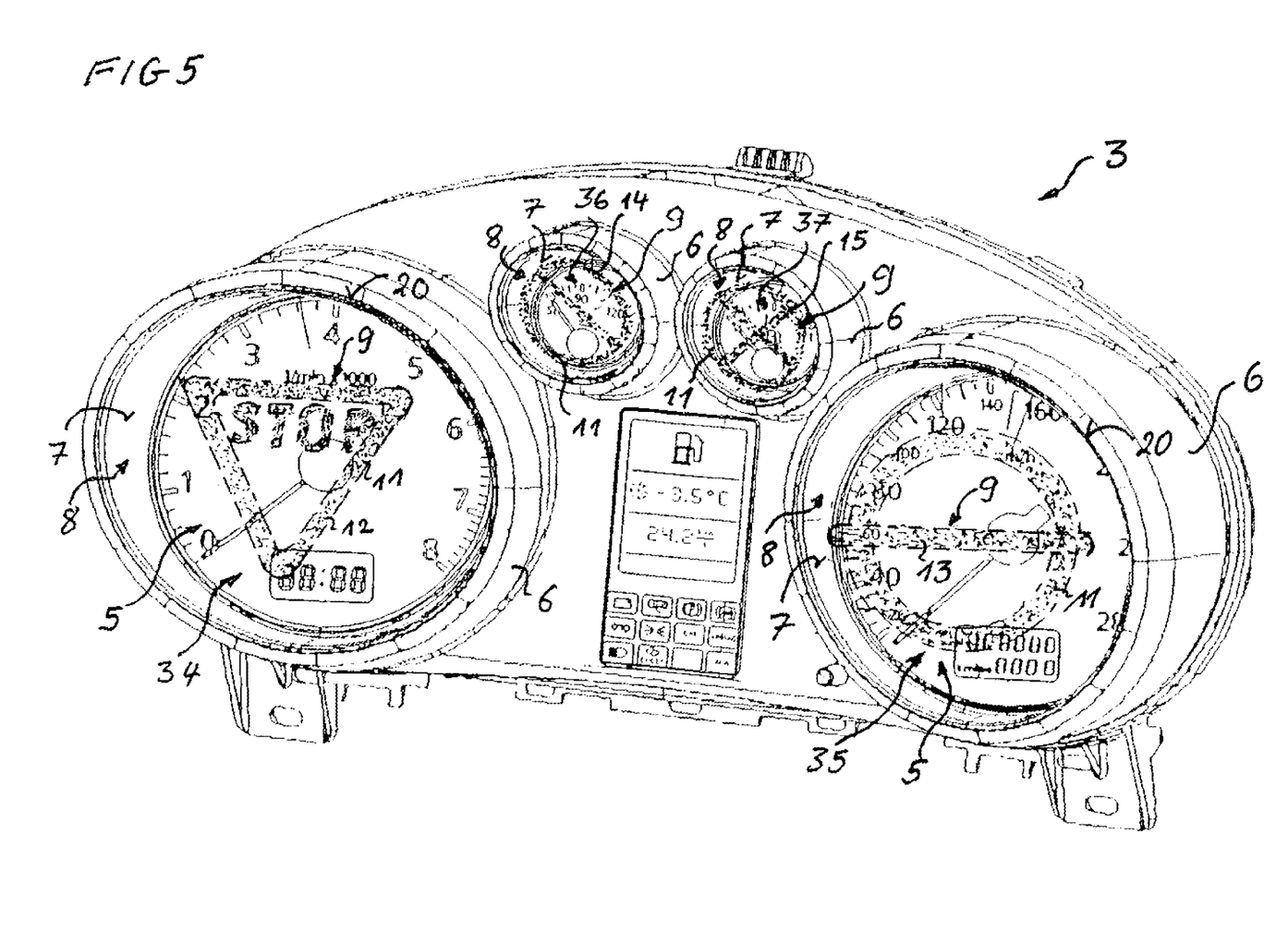
FIG. 5 shows a schematic perspective view of an instrument according to a third embodiment.

Since an instrument panel in a vehicle comprises a plurality of instruments, a third embodiment is shown in the following FIG. 5 with an instrument as instrument cluster, which in addition to a rotational speed display 34 comprises a speed display 35, a cooling water temperature display 36 and a fuel display 37.

The instrument coverings 7 can now cause suitably different warning symbols or traffic sign symbols to light up, so that with this instrument 3 a stop sign in the symbol display area 9 is already provided as traffic sign symbol 12. The instrument covering 7 of the speed display 35 comprises the traffic sign symbol 13 of a no entry, while the smaller instruments for cooling water temperature display 36 and fuel display 37 can comprise a traffic sign symbol 14 for a no waiting or a traffic sign symbol 15 for a no stopping prohibition. Lighting up of such warning symbols can however be also provided in order to display a critical temperature of the cooling temperature display 36 through lighting up of a warning symbol or to draw attention to a critical fuel quantity in the fuel display 37.

Figures 6, 6A:
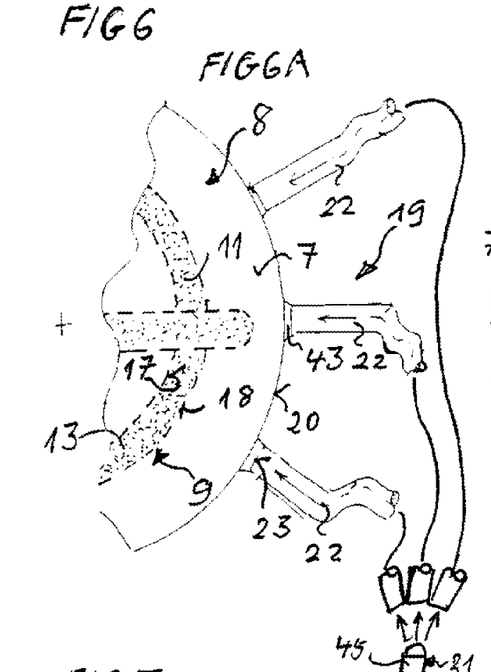
FIG. 6A and FIG. 6B show schematic diagrams of a light coupling to a symbol display area.
Figure 6B:
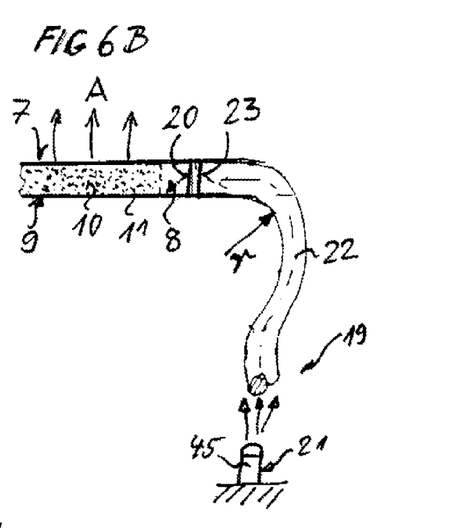

FIG. 6A and FIG. 6B are schematic diagrams of a light coupling to a symbol display area 9. In order to feed light of a light source 21, for example, of a light-emitting illumination diode 45 to an instrument covering 7 embodied as light conductor panel 8. Light conductors 22 of an illumination device 19 can be arranged between the light source 21 and the margin 20 in such a manner that light conductor ends 23 of the light conductors 22 are connected to the margin 20 of the light conductor panel 8 via a transparent adhesive 43, so that the light conductor panel 8 can conduct the light of the light source 21 to the symbol display area 9, in the volume 10 of which Nano particles 11, are arranged as shown in FIG. 6B, which diffuse light that for example causes graphic symbols 13 to light up.

With this coupling of light conductors 22 to the margin 20 of the light conductor panel 7 the light conductors 22 with their light conductor ends 23 are radially oriented towards the light conductor panel 8. Since light conductors 22 must not undershoot a critical radius R, an increase radius for the instrument housing is provided with this radial coupling. This radius can be reduced with a coupling arrangement as shown in FIG. 7A and FIG. 7B.

Figure 7A:
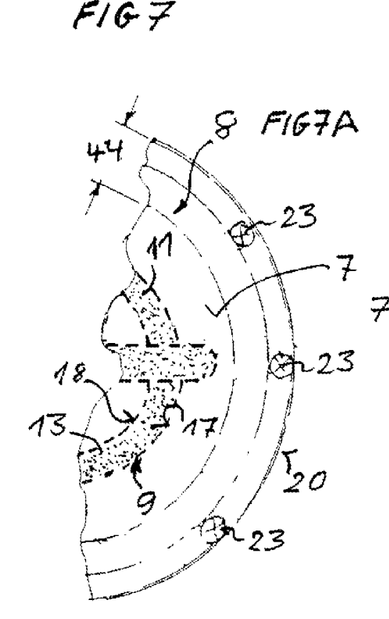
FIG. 7A and FIG. 7B show schematic diagrams of a modification of a light coupling to a symbol display area.
Figure 7B:
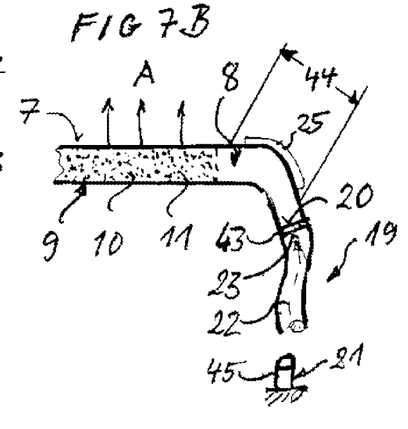

With this embodiment according to FIG. 7A and FIG. 7B, a marginal region 44 of the instrument covering 7 is bent off towards the light conductor ends 23 of the light conductors 22. In addition, the marginal region 44 can be provided with a mirrored coating 25 in the bent-off region of the marginal region 44 in order to reduce the diffusion losses in the bent marginal region 44 of the light conductor panel 8.

Figures 8, 8A:
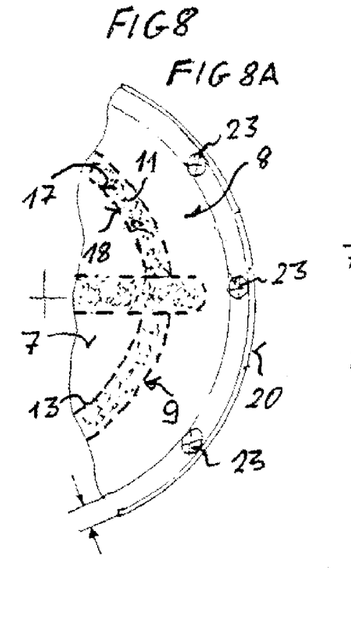
FIG. 8A and FIG. 8B show schematic diagrams of a further modification of a light coupling to a symbol display area.
Figure 8B:
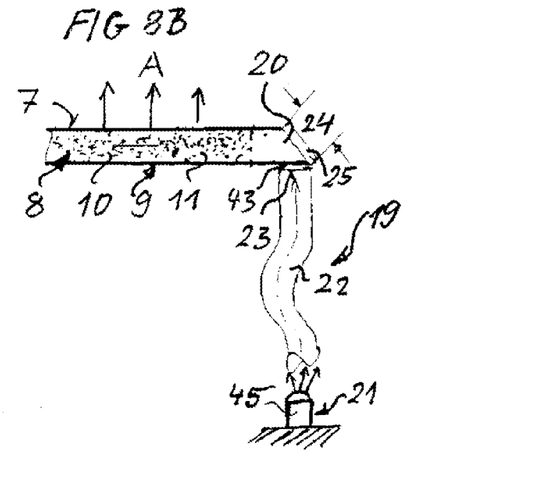

A further modification of the coupling of light conductor ends 23 to a margin 20 of an instrument is shown by FIG. 8A and FIG. 8B. Here, FIG. 8A shows a bottom view of the instrument covering 7 and FIG. 8B a cross section through the instrument covering 7. The margin 20 in this embodiment is provided with an approximately 45° chamfer 24 and the approximately 45° chamfer 24 simultaneously has a mirror-reflective coating 25, so that a light conductor end 23 of the light conductor 22 can be orthogonally oriented to the chamfered margin 20 of the light conductor panel 8, by which the smallest possible diameter for a coupling system is realized.

Figures 9, 9A:
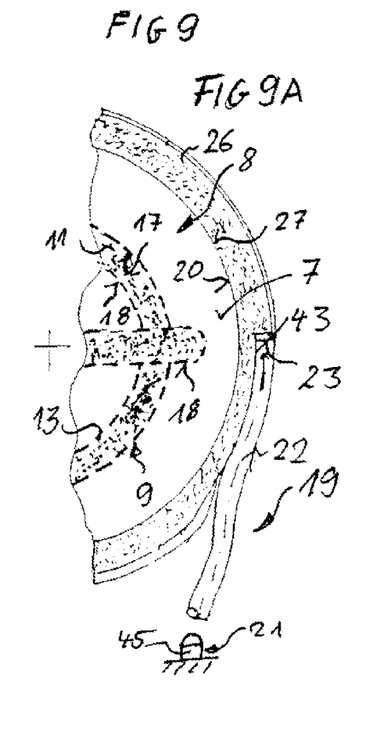
FIG. 9A and FIG. 9B show schematic diagrams of a further modification of al light coupling to a symbol display area.
Figure 9B:
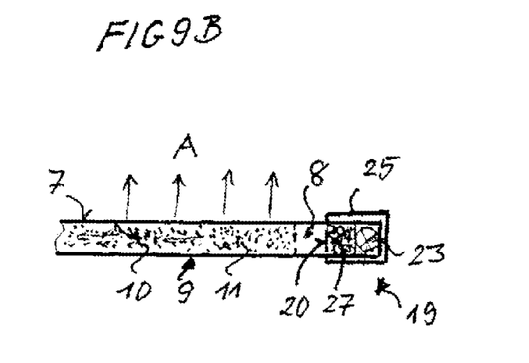

FIG. 9A and FIG. 9B are schematic diagrams of a further modification of a light coupling to the symbol display area 9. For this coupling of the light, an illumination ring 26 is brought into contact with the margin 20 of the instrument covering 7. The illumination ring 26 can be constructed of the same material as the light conductor panel 8 and in its volume comprise a higher concentration of light-diffusing Nano particles 11 than the concentration of the light-diffusing Nano particles 11 in the symbol display area 9. In order to cause the illumination ring 26 to light up, a light of a light source 21 can be tangentially coupled into the illumination ring 26, as is shown by FIG. 9A. In order to increase the light output, the outer surfaces of the illumination ring can comprise mirror-reflective coatings 25 as shown in FIG. 9B, so that merely a non-mirrored inner edge 27 of the illumination ring is materially joined to the edge 20 of the light conductor panel 8. In this illumination ring from FIG. 9A, a plurality of light conductors 22 can also be tangentially coupled in order to intensify a light coupling of the illumination ring 26.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents

What is claimed is:

1. An instrument for a motor vehicle comprising:
   a display area;
   a housing that surrounds the display area;
   a transparent instrument covering that is held and spaced from the display area by the housing; and
   a transparent light conductor panel of the transparent instrument covering in which a symbol display area is arranged, and
   wherein the transparent light conductor panel in a volume in the symbol display area comprises light-diffusing Nano particles.

2. The instrument according to claim 1, wherein the symbol display area comprises warning signs in traffic sign symbol form.

3. The instrument according to claim 1,
   wherein the symbol display area comprises outer contours
   wherein the transparent light conductor panel comprises recess contours, and
   wherein the outer contours of the symbol display area are materially joined to the recess contours of the transparent light conductor panel.

4. The instrument according to claim 1, wherein the transparent light conductor panel comprises a margin that is coupled to an illumination device.

5. The instrument according to claim 4, wherein the illumination device comprises at least one light source.

6. The instrument according to claim 1, wherein light from switchable color light sources are coupled into a margin of the instrument covering, which causes the light-diffusing nano particles in the symbol display area to light up in color in a light-diffusing manner, so that different hazard states are available via coloring.

7. The instrument according to claim 5, wherein the transparent light conductor panel comprises a Polymethylmethacryl plastic with the light-diffusing Nano particles in the symbol display area.

8. The instrument according to claim 5, wherein at least one light conductor is arranged between the at least one light source and the margin.

9. The instrument according to claim 8, wherein the margin of the instrument covering is at least partially bent towards a light conductor end of the at least one light conductor and coupled to the light conductor end.

10. The instrument according to claim 9,
    wherein the margin of the instrument covering comprises an angular chamfer that comprises a mirror-reflective coating, and
    wherein the at least one light conductor with the light conductor end is orthogonally oriented with respect to the transparent light conductor panel of the instrument covering in a region of the angular chamfer of the margin.

11. The instrument according to claim 10, wherein an illumination ring of a material of the transparent light conductor panel surrounds the margin of the instrument covering and comprises a higher concentration of light-diffusing Nano particles than the symbol display area.

12. The instrument according to claim 11, wherein the illumination ring with an inner margin is materially joined to the margin of the transparent light conductor panel and a remaining surface of the illumination ring comprises the mirror-reflective coating.

13. The instrument according to claim 11, wherein the light conductor end is oriented in such a manner that light of the at least on light source is tangentially coupled into the illumination ring.

14. A motor vehicle, comprising:
    an instrument panel;
    instrument as a component of the instrument panel, the instrument comprising: a display area;
    a housing that surrounds the display area; and
    a transparent instrument covering that is held and spaced from the display area by the housing; and
    a transparent light conductor panel of the transparent instrument covering in which a symbol display area is arranged, and
    wherein the transparent light conductor panel in a volume in the symbol display area comprises light-diffusing Nano particles.

15. The motor vehicle according to claim 14, wherein the symbol display area comprises warning signs in traffic sign symbol form.

16. The motor vehicle according to claim 14,
    wherein the symbol display area comprises outer contours
    wherein the transparent light conductor panel comprises recess contours, and
    wherein the outer contours of the symbol display area are materially joined to the recess contours of the transparent light conductor panel.

17. The motor vehicle according to claim 14, wherein the transparent light conductor panel comprises a margin that is coupled to an illumination device.

18. The motor vehicle according to claim 17, wherein the illumination device comprises at least one light source.

19. The motor vehicle according to claim 14, wherein light from switchable color light sources are coupled into a margin of the instrument covering, which causes the light-diffusing nano particles in the symbol display area to light up in color in a light-diffusing manner, so that different hazard states are available via coloring.

* * * * *